(12) United States Patent
Green

(10) Patent No.: US 9,764,476 B1
(45) Date of Patent: Sep. 19, 2017

(54) MECHANIZED ARM AND HAND DEVICE

(71) Applicant: Jermaine Green, Fayetteville, NC (US)

(72) Inventor: Jermaine Green, Fayetteville, NC (US)

(*) Notice: Subject to any disclaimer, the term of this patent is extended or adjusted under 35 U.S.C. 154(b) by 0 days.

(21) Appl. No.: 15/185,605

(22) Filed: Jun. 17, 2016

(51) Int. Cl.
*B25J 11/00* (2006.01)
*A01K 13/00* (2006.01)
*A01K 29/00* (2006.01)
*B25J 9/16* (2006.01)

(52) U.S. Cl.
CPC ............ *B25J 11/008* (2013.01); *A01K 13/004* (2013.01); *A01K 29/00* (2013.01); *B25J 9/1612* (2013.01)

(58) Field of Classification Search
CPC .... A01K 13/004; A01K 15/025; A61H 7/004; A61H 23/06; A61H 2203/03; A61H 7/00; B25J 11/008; B25J 9/1612
USPC .... 119/609, 702, 602; 601/117, 101, 95, 84, 601/89
See application file for complete search history.

(56) References Cited

U.S. PATENT DOCUMENTS

| | | | | |
|---|---|---|---|---|
| 3,552,388 A * | 1/1971 | Zelenka | ................ | A61M 21/00 601/112 |
| 4,608,967 A * | 9/1986 | Piro | ....................... | A61H 23/06 15/143.1 |
| 4,872,422 A * | 10/1989 | Della Vecchia | ..... | A01K 13/004 119/621 |
| 5,016,617 A * | 5/1991 | Tarlow | ................... | A61H 7/004 601/101 |
| 5,916,182 A * | 6/1999 | Fengler | .............. | A61H 15/0078 601/110 |
| 6,318,298 B1 * | 11/2001 | Nonay | ................. | A01K 13/004 119/14.18 |
| 6,485,442 B2 * | 11/2002 | Batula | ...................... | A47D 9/02 5/915 |
| D479,335 S | 9/2003 | Huang | | |
| 6,679,858 B2 * | 1/2004 | Ray | ........................ | A61H 7/004 601/101 |
| 6,994,680 B1 | 2/2006 | Aponte | | |
| 8,088,086 B1 * | 1/2012 | Schmuck | ............... | A61H 7/004 601/84 |
| 9,125,378 B1 * | 9/2015 | Frost | .................... | A01K 13/004 |
| 2006/0207518 A1 * | 9/2006 | Steffen | ................. | A01K 13/004 119/702 |

* cited by examiner

*Primary Examiner* — Yvonne Abbott-Lewis

(57) ABSTRACT

A mechanized arm and hand device for petting, stroking, patting and massaging a domestic animal includes a base configured for coupling to a surface. A housing and a socket are coupled to a top of the base. A power module and a microprocessor are coupled to and positioned in the housing. The microprocessor is operationally coupled to the power module. An arm is rotationally coupled to and extends from the socket. A hand is hingedly coupled to the arm distal from the socket. A plurality of motors is operationally coupled to the microprocessor. The motors are positioned singly in the socket and proximate to each of a plurality of joints that are positioned in the arm and the hand. The microprocessor is positioned to motivate the motors to manipulate the hand and the arm to selectively pet, stroke, pat and massage a domestic animal positioned proximate to the hand.

20 Claims, 5 Drawing Sheets

MECHANIZED ARM AND HAND DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

Figure 1:
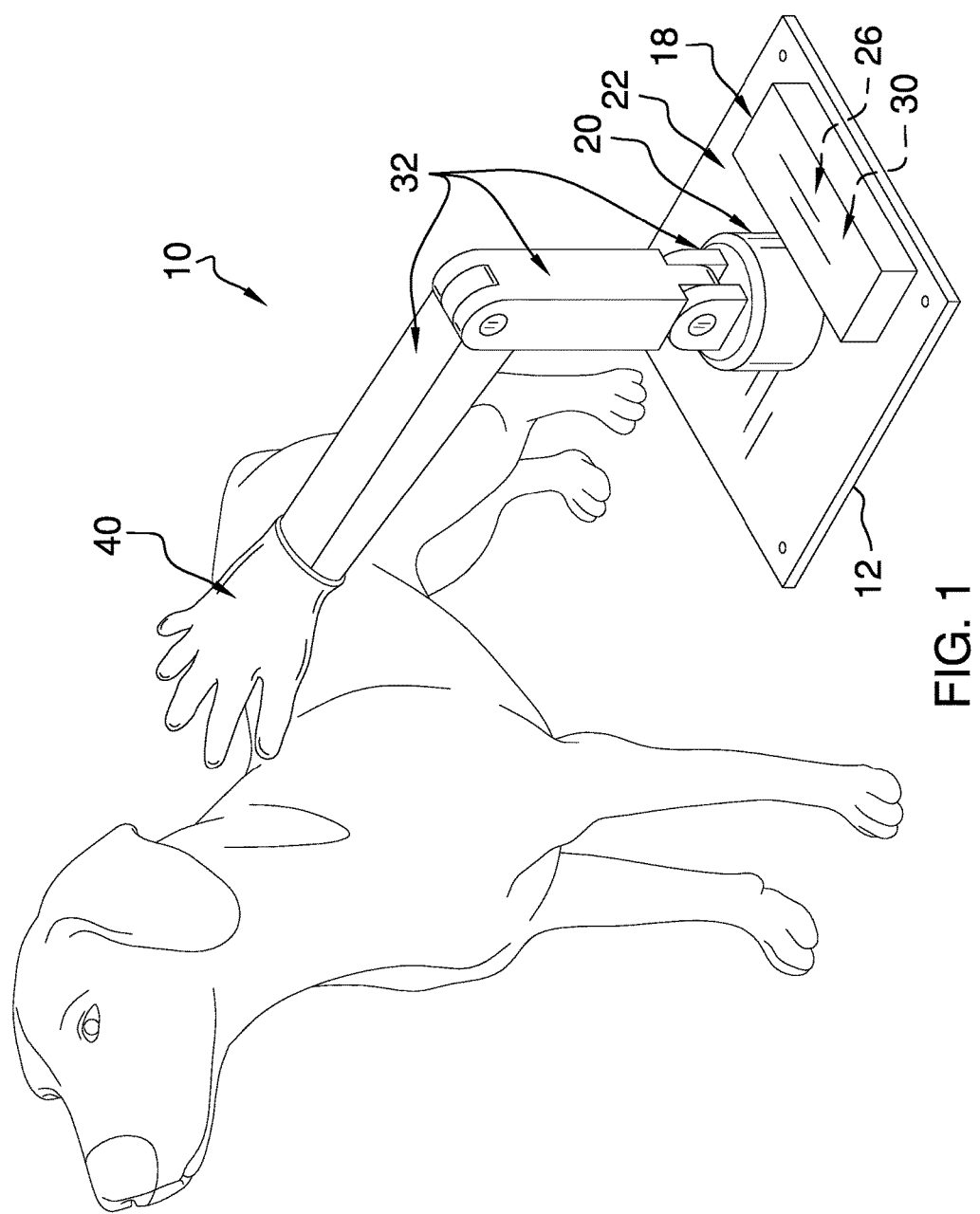

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed Under 37 CFR 1.97 and 1.98.

The disclosure and prior art relates to mechanized arm and hand devices and more particularly pertains to a new mechanized arm and hand device for petting, stroking, patting and massaging a domestic animal.

BRIEF SUMMARY OF THE INVENTION

An embodiment of the disclosure meets the needs presented above by generally comprising a base configured for coupling to a surface. A housing and a socket are coupled to a top of the base. A power module and a microprocessor are coupled to and positioned in the housing. The microprocessor is operationally coupled to the power module. An arm is rotationally coupled to and extends from the socket. A hand is hingedly coupled to the arm distal from the socket. A plurality of motors is operationally coupled to the microprocessor. The motors are positioned singly in the socket and proximate to each of a plurality of joints that are positioned in the arm and the hand. The microprocessor is positioned to motivate the motors to manipulate the hand and the arm to selectively pet, stroke, pat and massage a domestic animal positioned proximate to the hand.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

Figure 2:
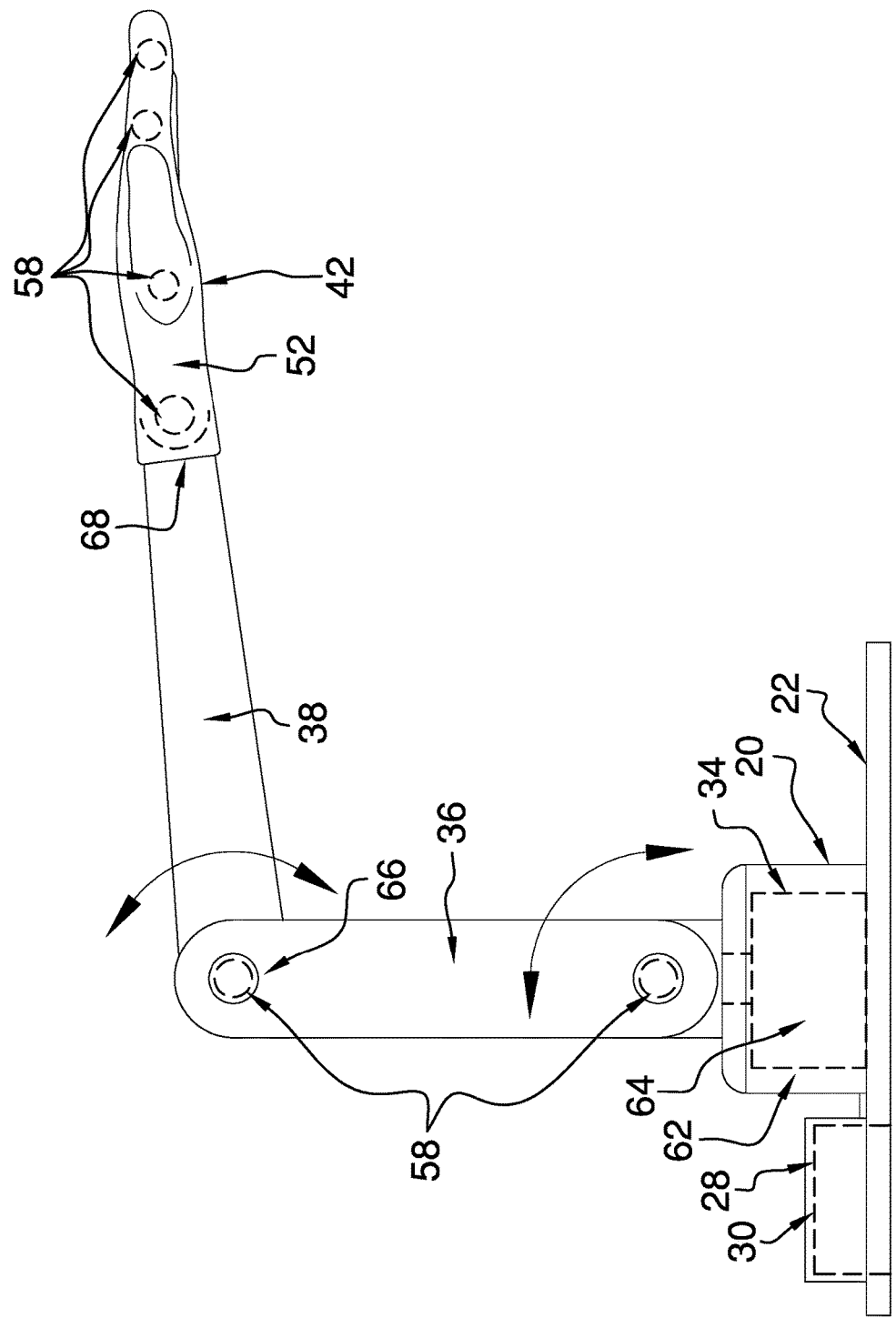
Figure 3:
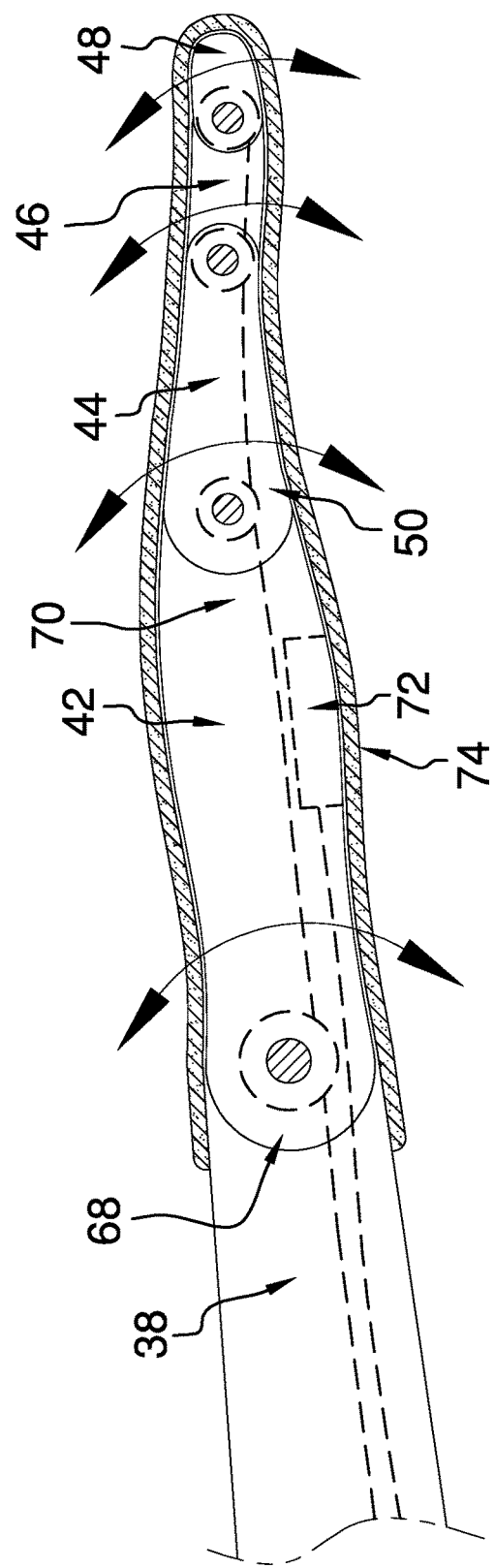
Figure 4:
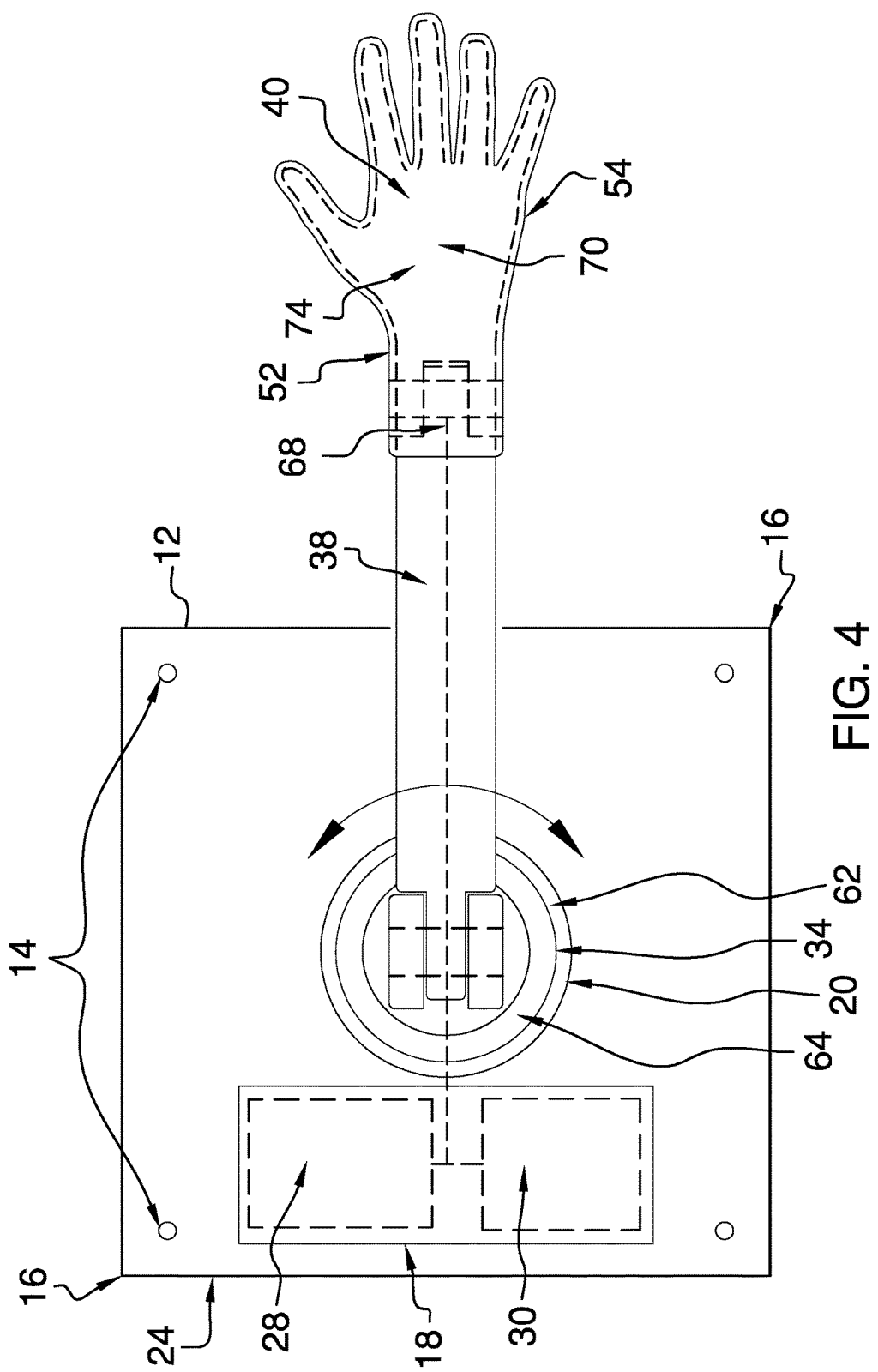
Figure 5:
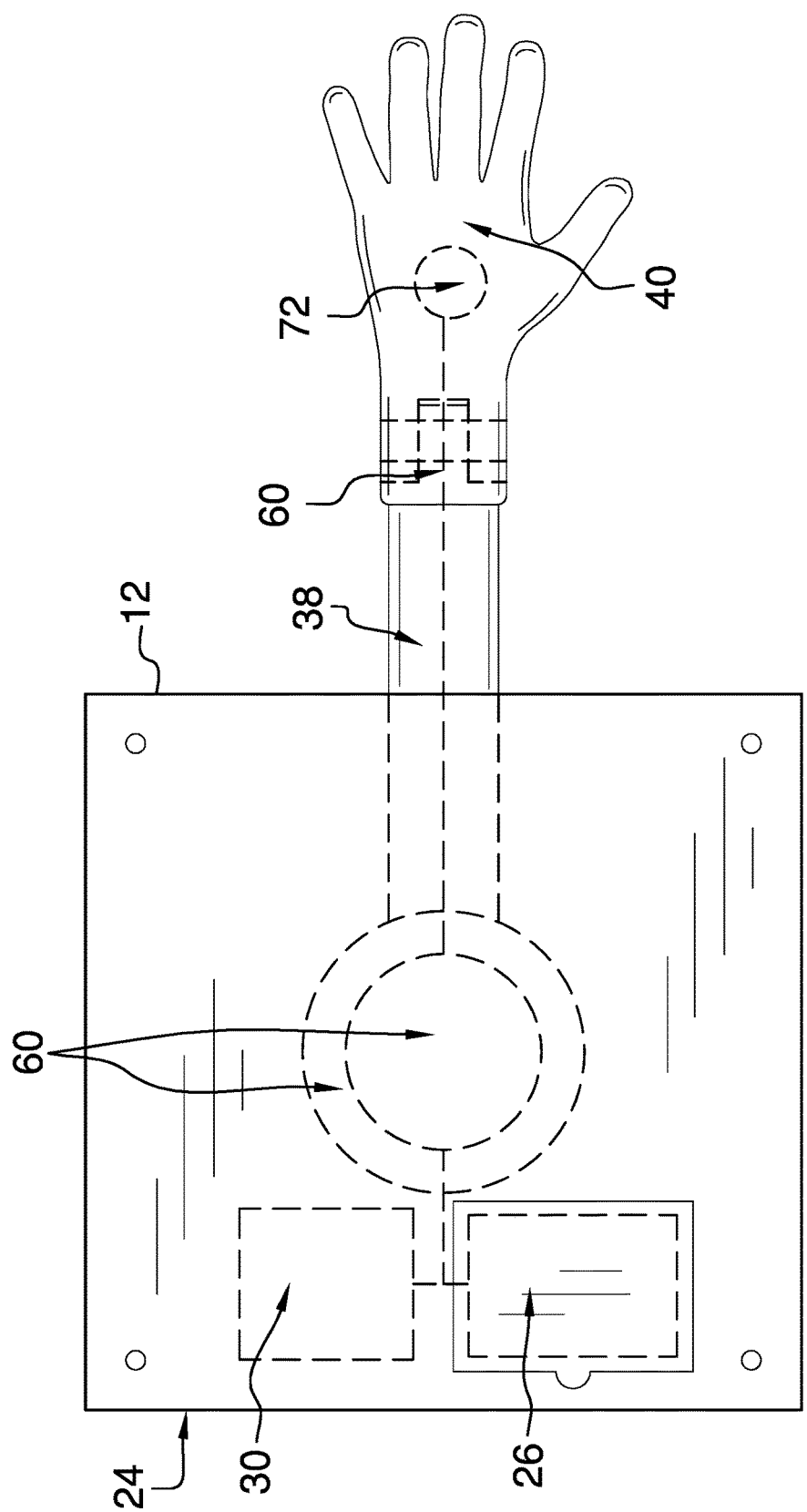

The disclosure will be better understood and objects other than those set forth above will become apparent when consideration is given to the following detailed description thereof. Such description makes reference to the annexed drawings wherein:

FIG. 1 is an in-use view of a mechanized arm and hand device according to an embodiment of the disclosure.
FIG. 2 is a side view of an embodiment of the disclosure.
FIG. 3 is a cross-sectional view of an embodiment of the disclosure.
FIG. 4 is a top view of an embodiment of the disclosure.
FIG. 5 is a bottom view of an embodiment of the disclosure.

DETAILED DESCRIPTION OF THE INVENTION

With reference now to the drawings, and in particular to FIGS. 1 through 5 thereof, a new mechanized arm and hand device embodying the principles and concepts of an embodiment of the disclosure and generally designated by the reference numeral 10 will be described.

As best illustrated in FIGS. 1 through 5, the mechanized arm and hand device 10 generally comprises a base 12 that is configured to couple to a surface. The base 12 is substantially rectangularly box shaped. The base 12 comprises a plurality of penetrations 14 that is positioned through the base 12. The base 12 is configured for insertion of mounting hardware through the penetrations 14 such that the base 12 is coupled to the surface. The plurality of penetrations 14 comprises penetrations 14 positioned proximate to each corner 16 of the base 12.

A housing 18 and a socket 20 are coupled to a top 22 of the base 12. The housing 18 is positioned proximate to a back edge 24 of the base 12. The housing 18 is substantially rectangularly box shaped. The socket 20 is substantially centrally positioned on the top 22. The socket 20 is cylindrically shaped.

A power module 26 is coupled to and positioned in the housing 18. The power module 26 comprises at least one battery 28. The battery 28 is rechargeable. A microprocessor 30 is coupled to and positioned in the housing 18. The microprocessor 30 is operationally coupled to the power module 26.

An arm 32 is rotationally coupled to and extends from the socket 20. The arm 32 comprises a ball 34 that is complementary to and positioned in the socket 20. A first bar 36 is hingedly coupled to and extends from the ball 34. The first bar 36 is substantially square when viewed longitudinally. A second bar 38 is hingedly coupled to and extends from the first bar 36 distal from the ball 34. The second bar 38 is substantially square when viewed longitudinally.

A hand 40 is hingedly coupled to the arm 32 distal from the socket 20. The hand 40 comprises a plate 42, a set of five first rods 44, a set of five second rods 46 and a set of five third rods 48. The plate 42 is hingedly coupled to the arm 32. The plate 42 is substantially rectangularly box shaped. Four of the first rods 44 are hingedly coupled to an end 50 of the plate 42 distal from the arm 32. One of the first rods 44 is hingedly coupled to a side 52 of the plate 42 proximate to the arm 32. Each second rod 46 is hingedly coupled to and extends from a respective first rod 44 distal from the plate 42. Each third rod 48 is hingedly coupled to and extends from a respective second rod 46 distal from an associated first rod 44.

The device 10 also comprises a covering 54. The covering 54 is complementary to, positioned over, and coupled to the hand 40. The covering 54 is resilient. The covering 54 is positioned on the hand 40 such that the hand 40 mimics a human hand. The covering 54 comprises silicone.

A plurality of motors 56 is operationally coupled to the microprocessor 30. The motors 56 are positioned singly in the socket 20 and proximate to each of a plurality of joints 58 that is positioned in the arm 32 and the hand 40. The plurality of motors 56 comprises servomotors 60.

In one embodiment, the plurality of motors 56 comprises a first motor 62, a second motor 64, a third motor 66, a fourth motor 68 and a fifth motor 70. The first motor 62 is coupled to and positioned in the socket 20. The first motor 62 is operationally coupled to the ball 34. The first motor 62 is positioned to rotate the ball 34 relative to the socket 20. The second motor 64 is positioned in the ball 34 and is operationally coupled to the first bar 36. The second motor 64 is positioned to pivot the first bar 36 relative to the socket 20. The third motor 66 is positioned in the first bar 36 and is operationally coupled to the second bar 38. The third motor 66 is positioned to pivot the second bar 38 relative to the first bar 36. The fourth motor 68 is positioned in the second bar 38 and is operationally coupled to the hand 40. The fourth motor 68 is positioned to pivot the hand 40 relative to the second bar 38. The fifth motor 70 is positioned in the plate 42. The fifth motor 70 is operationally coupled to each of the set of five first rods 44, each of the set of five second rods 46 and each of the set of five third rods 48. The fifth motor 70 is positioned to pivot each first rod 44 relative to the plate 42, each second rod 46 relative to an associated first rod 44, and each third rod 48 relative to an associated the second rod 46.

In another embodiment, the fifth motor 70 comprises a set of five fifth motors 70 positioned in the plate 42. Each fifth motor 70 is operationally coupled to a respective first rod 44, a respective second rod 46 and a respective third rod 48. Each fifth motor 70 is positioned to pivot the respective first rod 44 relative to the plate 42, the respective second rod 46 relative to the respective first rod 44 and the respective third rod 48 relative to the respective second rod 46.

A sensor 72 is coupled to the hand 40 and faces downwardly from a palm 74 of the hand 40. The sensor 72 is operationally coupled to the microprocessor 30. The sensor 72 is positioned on the palm 74 such that the sensor 72 is configured to sense a domestic animal positioned proximate to the hand 40.

The present invention also anticipates a control panel operationally coupled to the microprocessor 30. The control panel is positioned to allow the user to selectively enter petting, stroking, patting and massaging routines into the microprocessor 30.

In use, the sensor 72 is positioned on the palm 74 such that the sensor 72 is configured to sense a domestic animal positioned proximate to the hand 40. The microprocessor 30 is positioned to motivate the motors 56 to manipulate the hand 40 and the arm 32 to selectively pet, stroke, pat and massage a domestic animal positioned proximate to the hand 40.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A mechanized arm and hand device comprising:
    a base configured for coupling to a surface;
    a housing and a socket coupled to a top of said base;
    a power module coupled to and positioned in said housing;
    a microprocessor coupled to and positioned in said housing, said microprocessor being operationally coupled to said power module;
    an arm rotationally coupled to and extending from said socket;
    a hand hingedly coupled to said arm distal from said socket;
    a plurality of motors operationally coupled to said microprocessor, said motors being positioned singly in said socket and proximate to each of a plurality of joints positioned in said arm and said hand; and
    wherein said microprocessor is positioned to motivate said motors to manipulate said hand and said arm to selectively pet, stroke, pat and massage a domestic animal positioned proximate to said hand.

2. The device of claim 1, further including said base being substantially rectangularly box shaped.

3. The device of claim 2, further including said base comprising a plurality of penetrations, wherein said penetrations are positioned through said base such that said base is configured for insertion of mounting hardware through said penetrations wherein said base is coupled to the surface.

4. The device of claim 3, further including said plurality of penetrations comprising said penetrations positioned proximate to each corner of said base.

5. The device of claim 1, further including said housing being positioned proximate to a back edge of said base.

6. The device of claim 1, further including said housing being substantially rectangularly box shaped.

7. The device of claim 1, further including said socket being substantially centrally positioned on said top.

8. The device of claim 1, further including said socket being cylindrically shaped.

9. The device of claim 1, further including said power module comprising at least one battery.

10. The device of claim 9, further including said battery being rechargeable.

11. The device of claim 1, further including said arm comprising:
    a ball complementary to and positioned in said socket;
    a first bar hingedly coupled to and extending from said ball; and a second bar hingedly coupled to and extending from said first bar distal from said ball.

12. The device of claim 11, further including said first bar and said second bar being substantially square when viewed longitudinally.

13. The device of claim 11, further including said hand comprising:
- a plate hingedly coupled to said arm, said plate being substantially rectangularly box shaped;
- a set of five first rods, four of said first rods being hingedly coupled to an end of said plate distal from said arm, one of said first rods being hingedly coupled to a side of said plate proximate to said arm;
- a set of five second rods, each said second rod being hingedly coupled to and extending from a respective said first rod distal from said plate; and
- a set of five third rods, each said third rod being hingedly coupled to and extending from a respective said second rod distal from an associated said first rod.

14. The device of claim 13, further including said plurality of motors comprising;
- a first motor coupled to and positioned in said socket, said first motor being operationally coupled to said ball, wherein said first motor is positioned to rotate said ball relative to said socket;
- a second motor positioned in said ball and operationally coupled to said first bar, wherein said second motor is positioned to pivot said first bar relative to said socket;
- a third motor positioned in said first bar and operationally coupled to said second bar, wherein said third motor is positioned to pivot said second bar relative to said first bar;
- a fourth motor positioned in said second bar and operationally coupled to said hand, wherein said fourth motor is positioned to pivot said hand relative to said second bar; and
- a fifth motor positioned in said plate, said fifth motor being operationally coupled to each of said set of five first rods, each of said set of five second rods and each of said set of five third rods, wherein said fifth motor is positioned to pivot each said first rod relative to said plate, each said second rod relative to an associated said first rod and each said third rod relative to an associated said second rod.

15. The device of claim 14, further including said fifth motor comprising a set of five fifth motors positioned in said plate, each said fifth motor being operationally coupled to a respective said first rod, a respective said second rod and a respective said third rod, wherein said fifth motor is positioned to pivot said respective said first rod relative to said plate, said respective said second rod relative to said respective said first rod and said respective said third rod relative to said respective said second rod.

16. The device of claim 1, further including a covering, said covering being complementary to, positioned over, and coupled to said hand, said covering being resilient, wherein said covering is positioned on said hand such that said hand mimics a human hand.

17. The device of claim 16, further including said covering comprising silicone.

18. The device of claim 1, further including said plurality of motors comprising servomotors.

19. The device of claim 1, further including a sensor coupled to said hand and facing downwardly from a palm of said hand, said sensor being operationally coupled to said microprocessor, wherein said sensor is positioned on said palm such that said sensor is configured to sense a domestic animal positioned proximate to said hand.

20. A mechanized arm and hand device comprising:
- a base configured for coupling to a surface, said base being substantially rectangularly box shaped, said base comprising a plurality of penetrations, wherein said penetrations are positioned through said base such that said base is configured for insertion of mounting hardware through said penetrations wherein said base is coupled to the surface, said plurality of penetrations comprising said penetrations positioned proximate to each corner of said base;
- a housing and a socket coupled to a top of said base, said housing being positioned proximate to a back edge of said base, said housing being substantially rectangularly box shaped, said socket being substantially centrally positioned on said top, said socket being cylindrically shaped;
- a power module coupled to and positioned in said housing, said power module comprising at least one battery, said battery being rechargeable;
- a microprocessor coupled to and positioned in said housing, said microprocessor being operationally coupled to said power module;
- an arm rotationally coupled to and extending from said socket, said arm comprising:
  - a ball complementary to and positioned in said socket,
  - a first bar hingedly coupled to and extending from said ball, said first bar being substantially square when viewed longitudinally, and
  - a second bar hingedly coupled to and extending from said first bar distal from said ball, said second bar being substantially square when viewed longitudinally;
- a hand hingedly coupled to said arm distal from said socket, said hand comprising:
  - a plate hingedly coupled to said arm, said plate being substantially rectangularly box shaped,
  - a set of five first rods, four of said first rods being hingedly coupled to an end of said plate distal from said arm, one of said first rods being hingedly coupled to a side of said plate proximate to said arm,
  - a set of five second rods, each said second rod being hingedly coupled to and extending from a respective said first rod distal from said plate, and
  - a set of five third rods, each said third rod being hingedly coupled to and extending from a respective said second rod distal from c said first rod;
- a covering, said covering being complementary to, positioned over, and coupled to said hand, said covering being resilient, wherein said covering is positioned on said hand such that said hand mimics a human hand, said covering comprising silicone;
- a plurality of motors operationally coupled to said microprocessor, said motors being positioned singly in said socket and proximate to each of a plurality of joints positioned in said arm and said hand, said plurality of motors comprising servomotors, said plurality of motors comprising;
  - a first motor coupled to and positioned in said socket, said first motor being operationally coupled to said ball, wherein said first motor is positioned to rotate said ball relative to said socket,
  - a second motor positioned in said ball and operationally coupled to said first bar, wherein said second motor is positioned to pivot said first bar relative to said socket, a third motor positioned in said first bar and operationally coupled to said second bar, wherein said third motor is positioned to pivot said second bar relative to said first bar, a fourth motor positioned in said second bar and operationally coupled to said hand, wherein said fourth motor is positioned to pivot said hand relative to said second bar, and a fifth motor positioned in said plate, said fifth motor being operationally coupled to each of said set of five first rods, each of said set of five second rods and each of said set of five third rods, wherein said fifth motor is positioned to pivot each said first rod relative to said plate, each said second rod relative to an associated said first rod and each said third rod relative to an associated said second rod;

said fifth motor comprising a set of five fifth motors positioned in said plate, each said fifth motor being operationally coupled to a respective said first rod, a respective said second rod and a respective said third rod, wherein said fifth motor is positioned to pivot said respective said first rod relative to said plate, said respective said second rod relative to said respective said first rod and said respective said third rod relative to said respective said second rod;

a sensor coupled to said hand and facing downwardly from a palm of said hand, said sensor being operationally coupled to said microprocessor, wherein said sensor is positioned on said palm such that said sensor is configured to sense a domestic animal positioned proximate to said hand; and wherein said sensor is positioned on said palm such that said sensor is configured to sense a domestic animal positioned proximate to said hand, wherein said microprocessor is positioned to motivate said motors to manipulate said hand and said arm to selectively pet, stroke, pat and massage a domestic animal positioned proximate to said hand.

\* \* \* \* \*